United States Patent [19]

Melchionna

[11] Patent Number: 5,361,913

[45] Date of Patent: Nov. 8, 1994

[54] REVERSE BOTTLE VENDING, CRUSHING AND SORTING MACHINE

[75] Inventor: Carmine M. Melchionna, Watertown, Conn.

[73] Assignee: New England Redemption of Connecticut, Inc., New Haven, Conn.

[21] Appl. No.: 43,443

[22] Filed: Apr. 6, 1993

[51] Int. Cl.⁵ .............................................. B07C 5/00
[52] U.S. Cl. .................................. 209/583; 209/930; 194/208; 194/209
[58] Field of Search ................ 194/208, 209; 209/583, 209/930

[56] References Cited

U.S. PATENT DOCUMENTS

| | | | |
|---|---|---|---|
| 4,248,389 | 2/1981 | Thompson et al. | 209/583 X |
| 4,285,426 | 8/1981 | Cahill | 194/4 |
| 4,316,533 | 2/1982 | Hughes et al. | 194/4 |
| 4,324,325 | 4/1982 | Dewoolfson | 194/4 |
| 4,492,295 | 1/1985 | DeWoolfson | 194/4 |
| 4,532,859 | 8/1985 | Solordal | 100/35 |
| 4,573,641 | 3/1986 | DeWoolfson et al. | 241/36 |
| 4,579,216 | 4/1986 | DeWoolfson et al. | 194/212 |
| 4,653,627 | 3/1987 | Hampson et al. | 194/209 |
| 4,919,534 | 4/1990 | Reed | 356/73 |
| 5,111,927 | 5/1992 | Schulze, Jr. | 194/209 |
| 5,161,661 | 11/1992 | Hammond | 194/209 |

Primary Examiner—David H. Bollinger
Attorney, Agent, or Firm—Kramer, Brufsky & Cifelli

[57] ABSTRACT

The apparatus consists of a machine for refunding glass bottle deposits, crushing the bottle and sorting the crushed glass as to color, either clear, brown or green. The bottle has a label provided with an optically read bar code which identifies the bottle's 1) color, 2) whether it must be returned to the manufacturer in one piece, and 3) whether a refund is, in fact, due for the particular bottle. The bottle is inserted in the apparatus and the bar code on the bottle passes beneath an optical scanner. If the bottle is refundable and of a particular color (i.e., clear, green, brown), a microprocessor electrically connected to the scanner activates a door and a deflector causing the bottle to fall into a glass crusher including a bin provided with a rotating plate which smashes the bottle. A chute beneath the glass crusher is positioned by the microprocessor so that the crushed glass is conveyed to one of three collection bins depending on the sensed color. If the bottle is not to be crushed, and is refundable, the microprocessor causes another door to open, opposite to the crusher entrance, and the bottle is collected in one piece in another bin. If the bottle is not refundable, it is returned to the customer. In the event the bottle is refundable, a coupon is printed and released by the apparatus for each bottle inserted in the machine.

10 Claims, 8 Drawing Sheets

REVERSE BOTTLE VENDING, CRUSHING AND SORTING MACHINE

BACKGROUND OF THE INVENTION

1. Field of the Invention

This invention relates to apparatus for collecting, crushing, sorting as to color and storing crushed glass bottles for recycling, and for dispensing tokens or the like in exchange for the collected bottles.

2. Description of the Prior Art

With increasing emphasis in recent years on energy conservation and environmental preservation, the collection and recycling of empty glass bottles has become an important factor in the conservation and preservation effort. The recycling of glass bottles has helped to reduce the presence of broken glass bottles strewn throughout the environment and lessen energy consumption by recycling empty glass bottles for future use. Numerous states and localities have adopted glass conservation programs that require the recycling of glass bottles.

Unfortunately, the lack of an efficient and economical system to recover and reuse glass bottles has largely caused a tremendous waste of recoverable bottles, since currently it is often easier and more economical, in the short term, to discard the bottles, instead of recycling them. Additionally, the recycling of bottles poses numerous problems in ascertaining whether a particular bottle is refundable; sorting refundable bottles by brand and color; and determining the value of the refund to be given by the store to the customer. Often, stores must either hire extra employees for these particular time consuming tasks or allow customers to return the bottles on an honor system, in which the customer is trusted to report the correct amount of the bottles he has returned.

Some machines have been developed for encouraging the recovery and recycling of glass bottle containers. For example, U.S. Pat. No. 4,248,389 to Thompson et al discloses an apparatus for sorting and handling diverse types of containers by using an optical scanner to read a code on the container. However, this machine does not preselect the containers prior to acceptance by the machine to distinguish between acceptable and unacceptable containers. Similarly, it does not sort the bottles by the color of the glass. Consequently, a customer who inserts a non-refundable bottle into the apparatus must wait while the machine conveys the bottle to the optical reader, which determines the identity of the bottle. The resulting crushed glass from the break up of the accepted bottles is a mixture of colors due to the lack of color separation by the machine of the diverse bottle colors. Accordingly, the crushed glass must either be painstakingly separated by color prior to use, or melted down as a color mixture, which mixture may have less economic value per unit weight than color separated glass.

In U.S. Pat. No. 4,573,641 to DeWoolfson et al, a glass bottle collection and crushing apparatus is disclosed which preselects only those bottles that are refundable prior to accepting the offered bottle into the machine. Unacceptable and nonrefundable bottles are recognized by the apparatus and not processed further. Once accepted, the refundable bottle is separated by color and crushed for easy storage, and eliminates the need of having a store or retailer use employees to identify and sort the refundable bottles, and give refunds to the customers. Rather, the customer, unaided, can return and receive a refund for his bottles. The refunded bottles are separated by color, crushed, and stored by the apparatus to make it easy for the glass of the bottles to be recovered for recycling. By crushing the returned bottles, the space requirements that the store must allocate for handling the returned bottles is lessened and, thereby, allows the store to use this valuable space for other more economical uses.

To achieve the foregoing advantages, the apparatus in U.S. Pat. No. 4,573,641 is used for collecting and storing refundable empty glass bottles of two or more individual colors and for issuing predetermined return deposits for the containers collected. Each refundable bottle has a code imprinted thereon. Preselection means are provided for determining the brand, color and refundability of a preferred empty glass bottle, the preselection means including a laser scanner for reading the imprinted code on each glass bottle, a bottle access area configured to accommodate bottles for exposure to the laser scanner, and a microprocessor capable of receiving and interpreting the read code from the laser scanner, means for accepting only a bottle identified by the preselection means as being refundable, the accepting means sorting the refundable bottles into either of two colors, means responsive to the accepting means for crushing the refundable bottles into glass cullet, the crushing means including one or more rotating crushing wheels, coin or token dispensing means responsive to the preselection means for dispensing coins in return for the refundable bottles, and means for storing the glass cullet received from the crushing means.

The accepting means further includes means to allow a bottle to fall inwardly to the crushing means. Depending upon the color of the bottle, the preselection means activates a proper solenoid and latch mechanisms to cause a panel to tilt inwardly, thereby allowing the bottle to fall by gravity into the crushing means. The crushing means includes one or more rotating crushing wheels positioned beneath each panel to receive the refundable bottles deposited by the accepting means and to crush the received bottles into glass cullet. A storage means can include a collection hopper positioned beneath the crushing wheels so that the crushed glass falls by gravity into the hoppers.

However, because the sorting occurs before the bottle is crushed, a separate crushing means and chambers must be provided in the apparatus for each color sorted bottle, duplicating a portion of the apparatus and its drive means, substantially increasing the cost of the machine. Rather, if the sorting of the glass as to color occurs after crushing of the bottles, substantial savings in equipment cost is realized, with little chance of color contamination of the glass.

SUMMARY OF THE INVENTION

Accordingly, the apparatus of the present invention consists of a machine for refunding glass bottle deposits, crushing the bottle and sorting the crushed glass as to color, either clear, brown or green. The bottle has a label provided with an optically read bar code which identifies the bottle's 1) color, 2) whether it must be returned to the manufacturer in one piece, and 3) whether a refund is, in fact, due for the particular bottle. The bottle is inserted in the apparatus and the bar code on the bottle passes beneath an optical scanner. If the bottle is refundable and of a particular color (i.e., clear, green, brown), a microprocessor electrically connected to the scanner activates a door and a deflector causes the bottle to fall into a glass crusher (a bin provided with a rotating plate which smashes the bottle). A trap door beneath the glass crusher is positioned by the microprocessor so that the crushed glass is conveyed to one of three collection bins depending on the sensed color. If the bottle is not to be crushed, the microprocessor causes another door to open (opposite to the crusher entrance) and the bottle is collected in one piece in another bin. In either event, a chit is printed and released by the apparatus for each bottle inserted in the machine. If the bottle does not warrant a refund, it is returned to the depositor.

BRIEF DESCRIPTION OF THE DRAWINGS

Further objects and advantages of the invention will become more apparent from the following description and claims and from the accompanying drawings, wherein:

DETAILED DESCRIPTION OF THE PREFERRED EMBODIMENT

Figure 1:
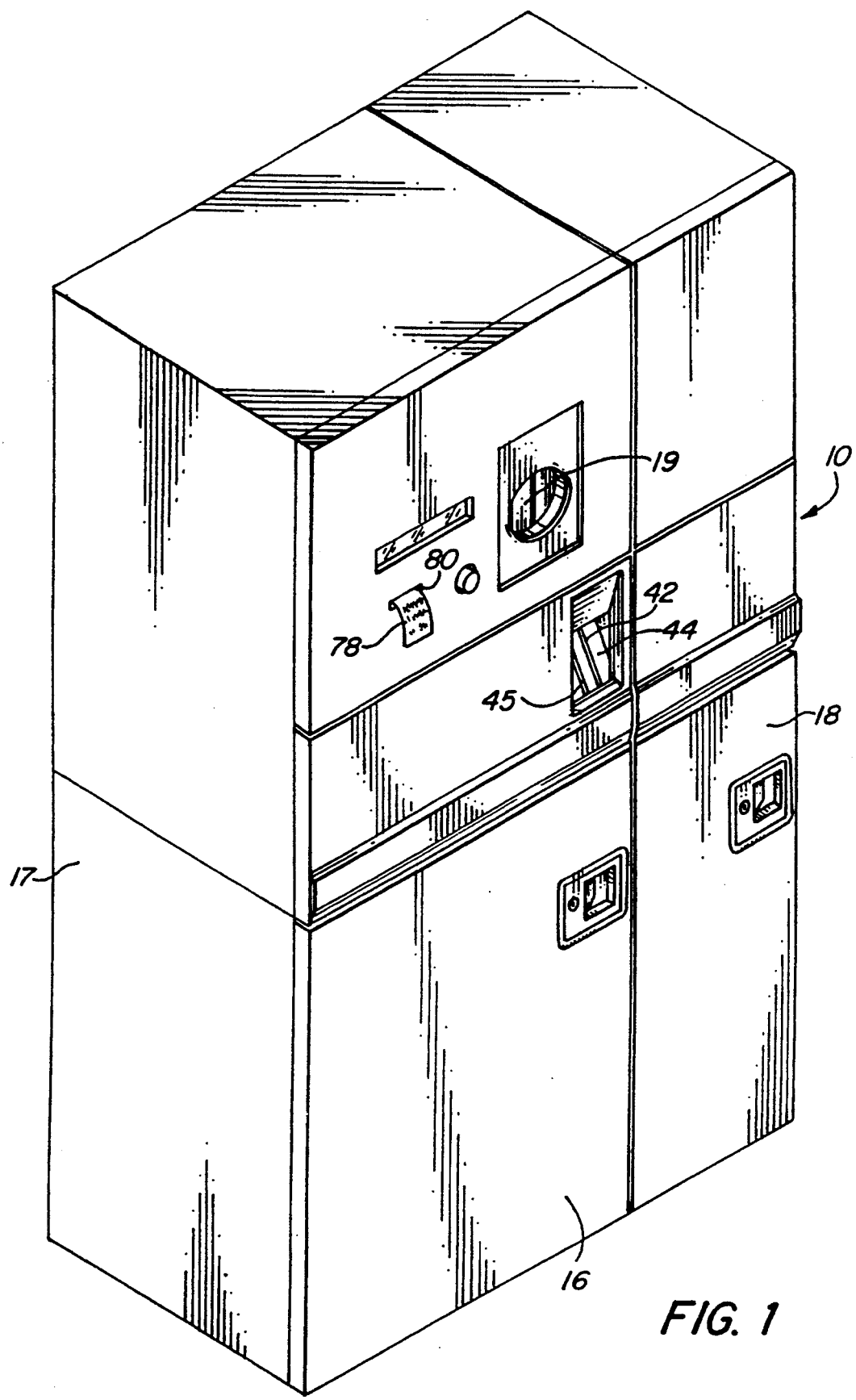
FIG. 1 is a perspective view of the reverse bottle vending, crushing and sorting machine of the present invention.
Figure 2:
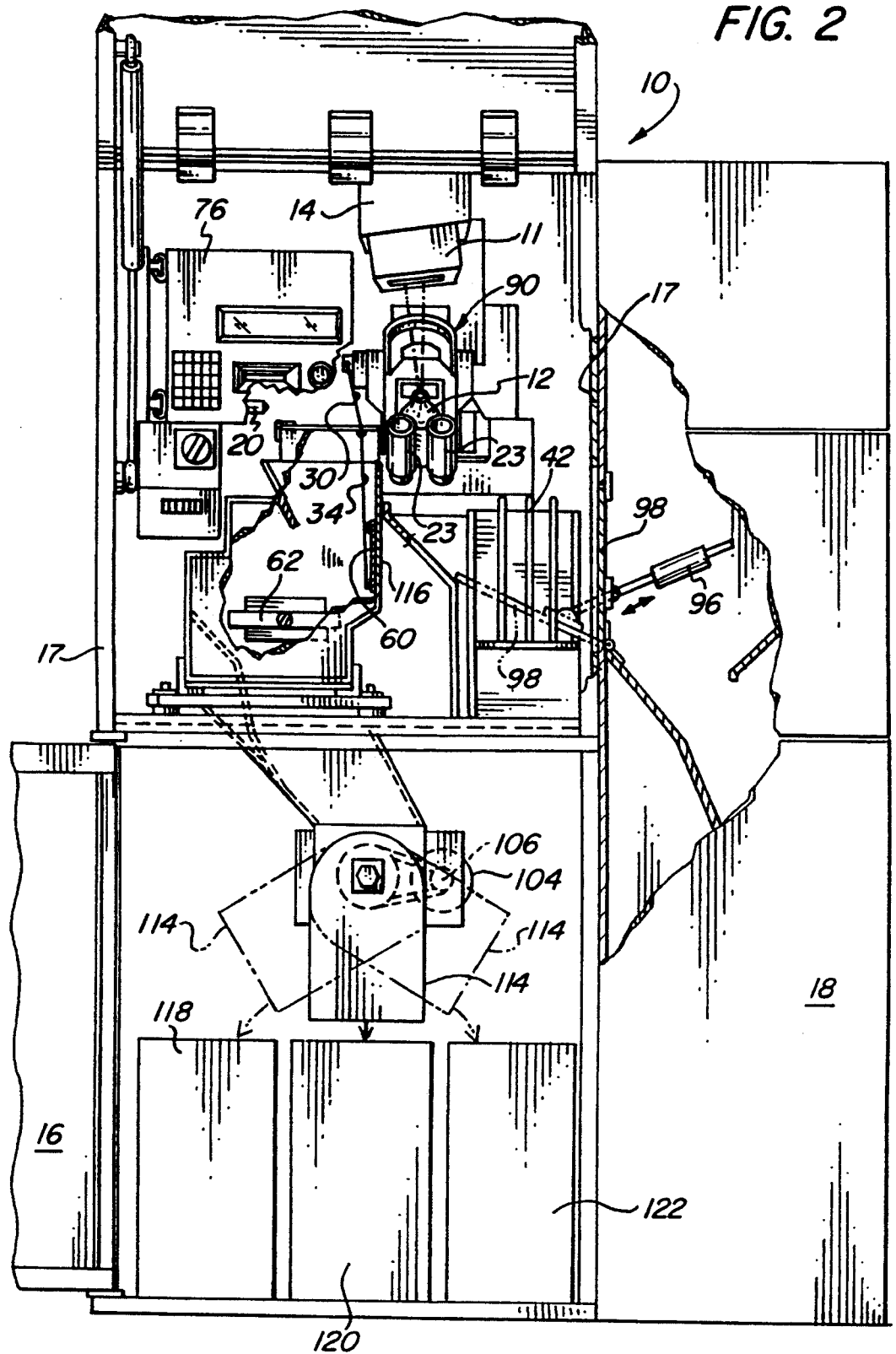
FIG. 2 is a partial front view in elevation of the machine of FIG. 1 with the front door opened and portions of a whole bottle collection bin broken away and in section to illustrate the interior thereof, along with selected other portions of the machine to illustrate the crushing means of the machine.
Figure 3:
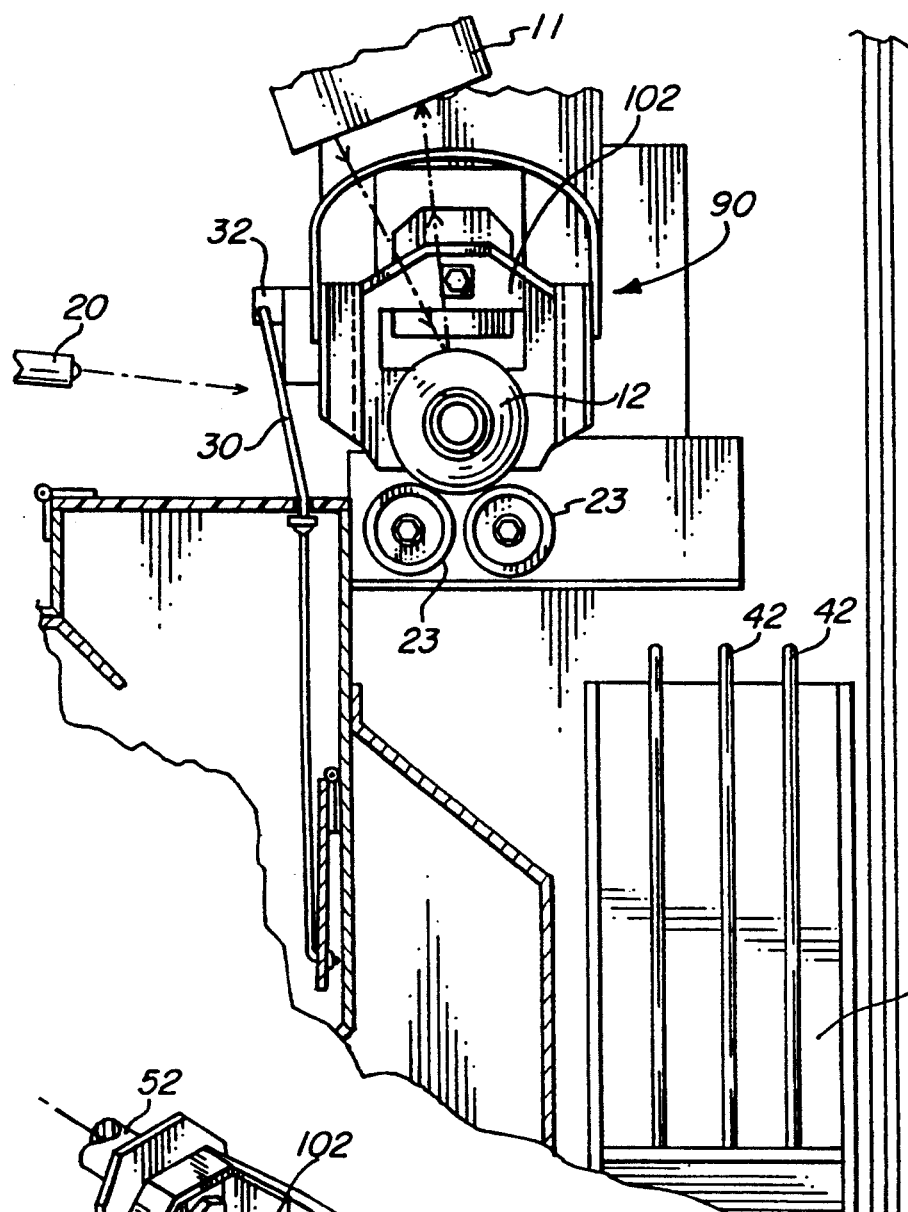
FIG. 3 is an enlarged front view in elevation of the bottle receiving portion of the machine of FIG. 2.
Figure 4:
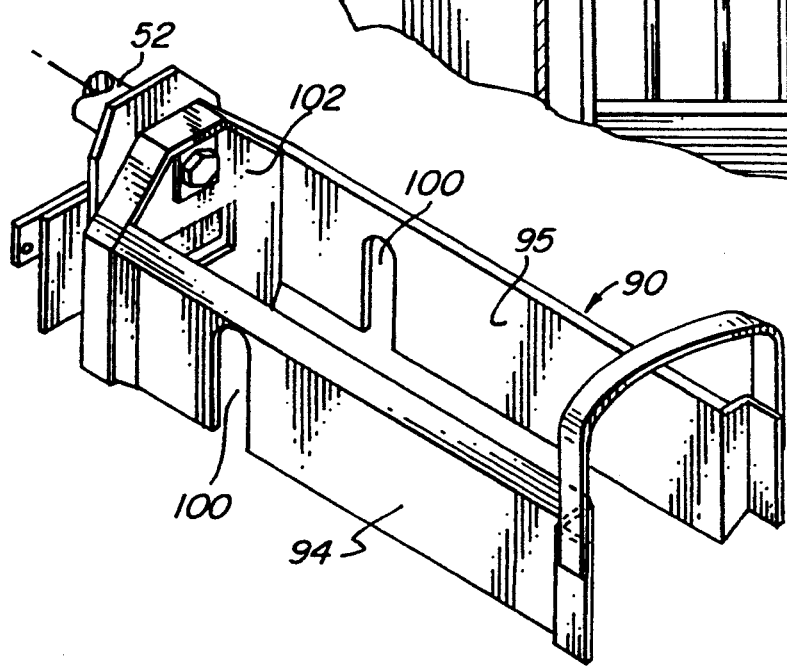
FIG. 4 is a perspective view of the bottle receiving harness of the bottle receiving portion of the machine of FIG. 3 used to move the bottle to either a whole collection bin or to the bottle crushing means.

Referring now to the drawings in detail wherein like numerals indicate like elements throughout the several views, the apparatus for collecting and storing glass bottles generally includes a cabinet housing 10, having a door 16, side panels 17, and an extension housing 18.

Figure 5:
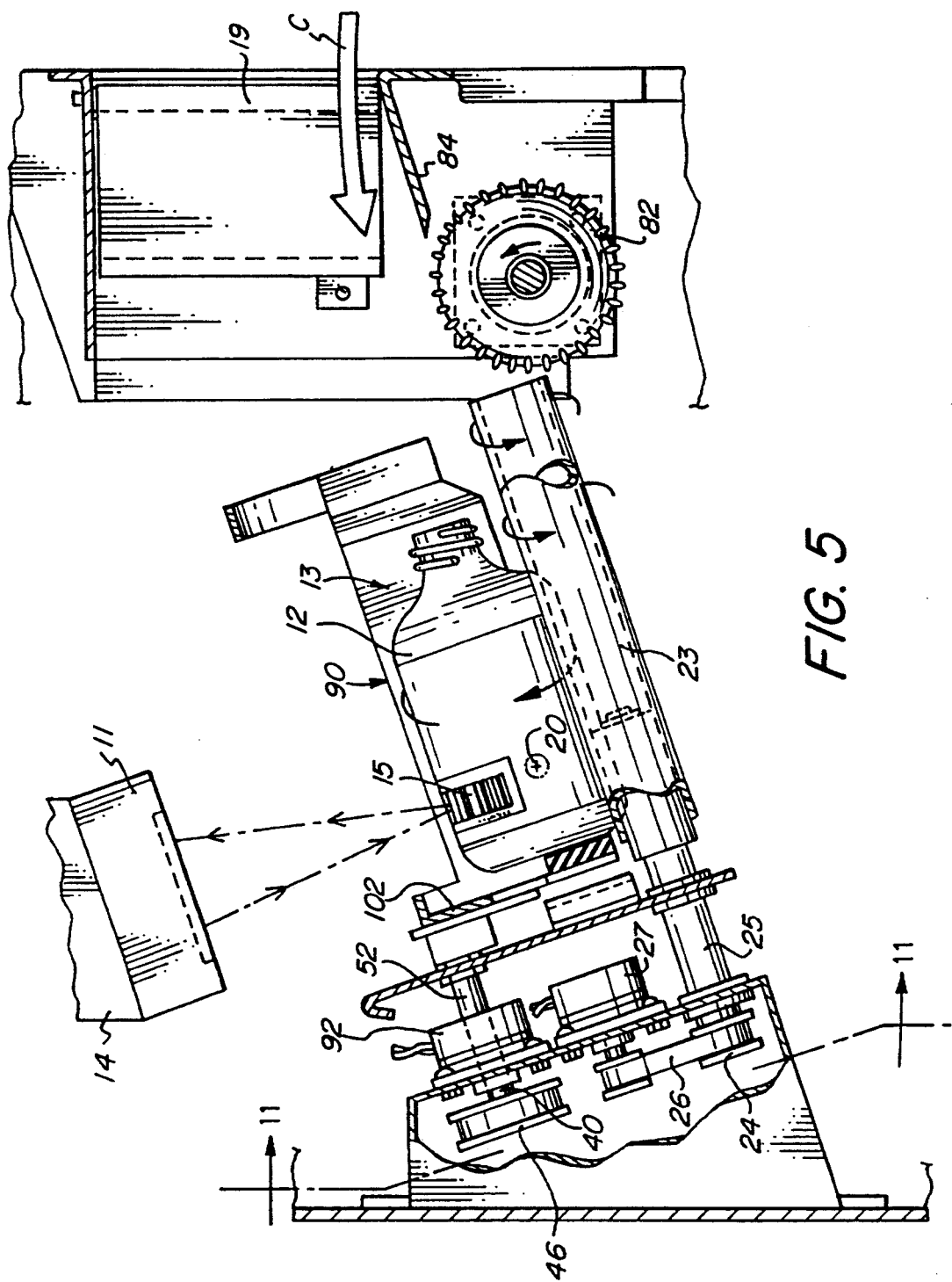
FIG. 5 is a side view in elevation, with portions broken away and in section of the bottle receiving portion of the machine of FIG. 3, as seen from the left hand side of FIG. 3.

In accordance with the invention, the apparatus for collecting and storing refundable empty glass bottles of diverse colors and for issuing predetermined return deposits for the bottles collected, each refundable bottle having code imprinted thereon to identify the brand and color of the bottle, includes preselection means for determining the brand, color and refundability of an empty glass bottle, the preselection means including a laser scanner for reading the imprinted code on each bottle, a bottle access area configured to accommodate the bottles for exposure to the laser scanner and a microprocessor capable of receiving and interpreting the read code from the laser scanner. As embodied herein, the preselection means includes a laser scanner 11 for identifying whether a bottle 12 placed within a bottle access area 13, or bottle receiving portion of the apparatus by the customer, is refundable, and the bottle access area 13 accommodates glass bottles of varying sizes, typically, within the range of 10 to 32 ounces. The laser scanner 11 is preferably mounted above the bottle access area 13. The door 16 has an opening 19 through which the bottles can be inserted, as indicated by arrow C in FIG. 5, to be placed in the bottle access area 13, sliding down a ramp 84 and conveyed by a rotating wheel 82 to the bottle access area or receiving portion 13 of the machine 10. The bottle comes to rest on a pair of rotating tubes 23 which continuously turn the bottle 12 to present the code 15 periodically to the laser scanner 11.

The preselection means further includes a microprocessor 14 positionable either within the cabinet housing 10 or apart from the cabinet housing 10 as a separate unit. The microprocessor 14 contains a programmable memory area. In operation, the laser scanner 11 reads an imprinted code 15 on each bottle 12 placed within the bottle access area 13, and transmits the read code to the microprocessor 14.

Figure 6:
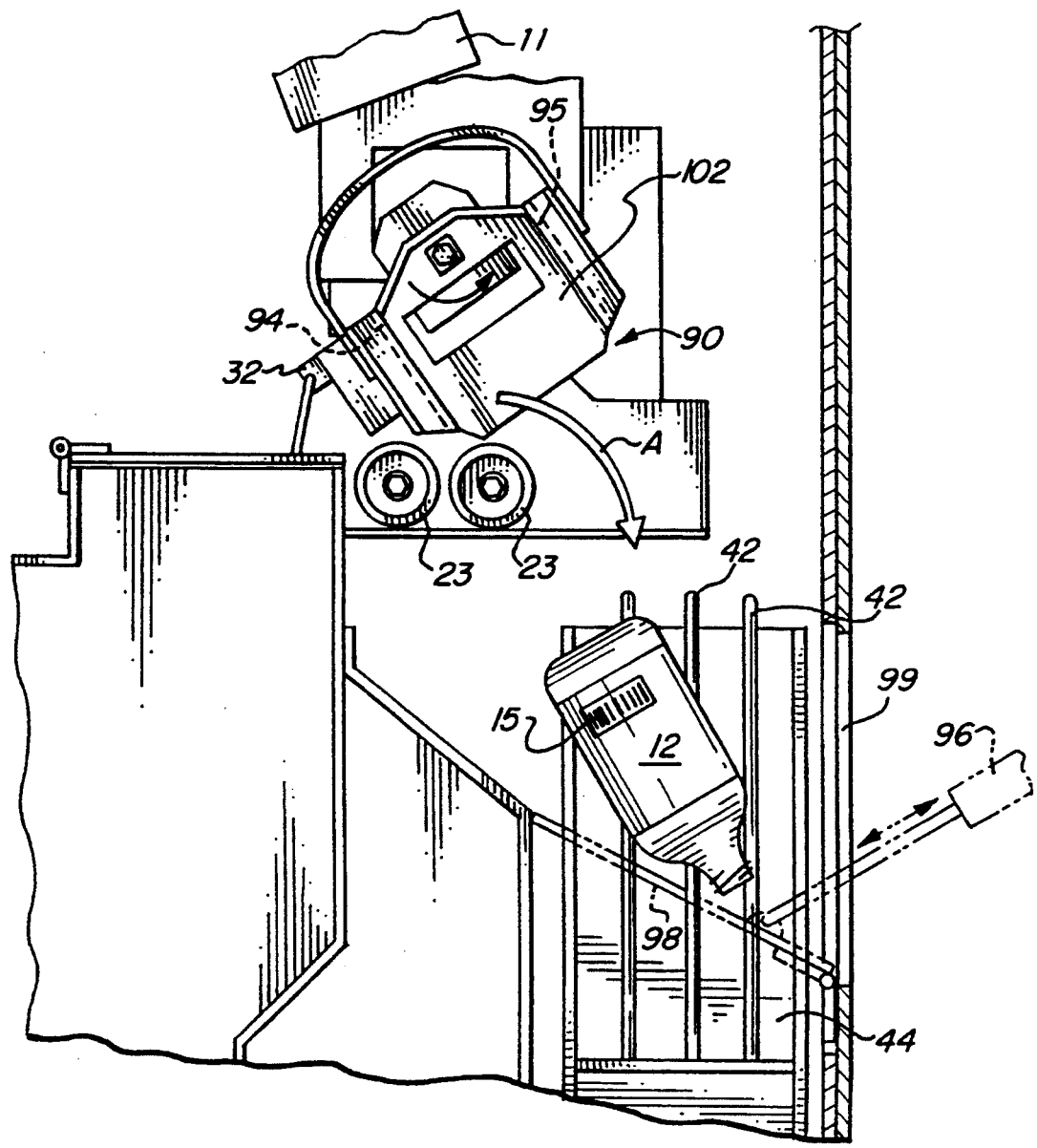
FIG. 6 is a view similar to FIG. 3 with a bottle inserted in the machine being either rejected as nonrefundable or being selected for return to the manufacturer intact and being moved to storage in a whole collection bin.

The microprocessor 14 receives the signal containing the read code from the laser scanner 11 and compares the read code with a list of codes contained within its programmable memory. The programmed codes provide information, such as refunds, price, and bottle color, about the acceptable, refundable glass bottles. If the read code matches a code on the programmed list, then the microprocessor 14 transmits a signal to the accepting means to indicate that the bottle 12 placed within the bottle access area 13 is to be received into the machine. However, if the read code fails to correspond with a code on the programmed list in the microprocessor programmable memory area, the microprocessor 14 transmits a signal to indicate that the bottle is unacceptable for refunding purposes and, accordingly, the bottle 12 should be removed from the bottle access area 13. Alternatively, the bottle may be of the type for which a refund is due, but, must be returned to the manufacturer in one piece. It may thus be on the list in the microprocessor, but must still be removed from area 13 and collected in a separate bin and not crushed. The signal generated by the microprocessor in either of these events can be used to activate a reversible motor 92 mounted whose shaft 40 is connected to the rear of a harness 90 surrounding the bottle 12 at the bottle access area 13, to rotate the harness 90 counterclockwise as shown in FIG. 6, to contact the bottle 12 with side 94 of harness 90 to sweep the bottle 12 to the right in FIG. 6 in direction of arrow A. The motor shaft 40 drives a pulley 46, endless belt 48 and pulley 50 connected to a shaft 52 at one end. The other end of shaft 52 is connected to the rear of harness 90.

If the bottle is non-refundable, it is returned to the customer. It strikes a series of sloping baffles 42, extending outwardly from a plate 44 and slides out an opening 45 provided in the front wall of housing 10. If the bottle 12 is refundable, but is to be returned in one piece to the manufacturer, simultaneously with rotation of harness 90, a solenoid 96 extends a pivotable trap door 98 on the inner sidewall of extension housing 18 to catch the rejected bottle 12 and allow it to slide down the door 98 through the opening 99 left in the inner sidewall of housing 18 into the interior of the housing for collection and return to the manufacturer. The baffles 42 extending from a plate 44 in the interior of the machine 10 aids in guiding the bottle 12 to extension housing 18.

The programmable memory of the microprocessor 14 can be programmed to include a coded list of the various brands or types of bottles that are acceptable for refunding by a particular retailer. The programmed list can be tailored to the particular retailer depending upon the bottle products that he is willing to provide a deposit refund. The programmed list can also include the deposit amount to be provided to the customer for each type or brand of bottle. The various refund amounts can be adjusted within the programmable memory area of the microprocessor 14 to allow for changes in the price structure. When the microprocessor 14 has determined that a particular bottle 12 placed within the bottle access area 13 is to be accepted for further processing and need not be returned to the manufacturer in one piece, the brand or type of the accepted bottle is stored in the memory area of the microprocessor 14. This storage of the bottle brand or type information in the microprocessor 14, allows a particular retailer to know the distribution and classification of the various bottles for which he has provided a refund.

Preferably, the code 15 imprinted on the bottles 12 is an UPC (Uniform Product Code) bar code, since its use has become relatively widespread. The laser scanner 11 and microprocessor 14 of the apparatus, however, can be programmed to read a wide variety of other types of codes imprinted on the bottles 12. Additionally, it is preferred that each refundable bottle contain marking that exhibits special spectral response properties, when viewed by the laser scanner 11, to indicate that the bottle is an authentic bottle for which a refund is to be provided. This marking can be used to decrease the likelihood of giving refunds for unacceptable or counterfeit bottles. Similarly, this marking can be used to indicate bottles from different localities to differentiate between bottles from localities that require the recycling of bottles and bottles from localities that do not require such recycling, and can be used to differentiate those bottles which are to be returned to the manufacturer in one piece from those which are to be ground up and smashed. The laser scanner 11 reads the marking and transmits a signal to the microprocessor 14 in the same manner as it reads and transmits the imprinted code 15 on the bottle 12. Alternatively, the marking can be included within the imprinted code 15 to provide, on a particular bottle 12, only one code location that must be read by the laser scanner 11.

Sensing means 20 can be positioned within or near the bottle access area 13 to sense the bottle 12 placed within the bottle access area 13 to ensure that a glass bottle 12, and not another type of container such as an aluminum can, is present within the bottle access area 13, or that a bottle is in or out of the area, per se. If a bottle is not present, the elements of the apparatus will return to their inoperative position. If a bottle is present, but not removed from harness 90, the microprocessor 14 can reactivate the sorting apparatus to tilt the harness 90 in an appropriate manner. The sidewalls 94 and 95 of the harness 90 are provided with elongated openings 100 to receive incident light from sensing means 20 and transmit the same through the bottle in a refracted or reflecting manner to a light sensing switch or the like which can provide a signal to the microprocessor to activate the same if a glass bottle 12 is in area 13.

The accepting means accepts for further processing only those bottles identified by the preselection means as being refundable, and which need not be returned in one piece to the manufacturer. As herein embodied, the accepting means includes two rotatable sleeves 23 mounted on individual shafts 25 driven by means of pulleys 24 connected by a belt 26 to the output shaft of a motor 27, which supports the bottle 12 in the bottle access area 13. The customer or retailer places the empty glass bottle 12 on the sleeves 23, through opening 19, and the bottle is rotated wherein the laser scanner 11 reads the imprinted code 15 on the bottle 12. The harness 90 includes an end wall 102 to provide an enclosure for the bottles 12 placed within the bottle access area.

The accepting means further includes means responsive to the preselection means to sort the refundable bottles into three colors, i.e. clear, brown, or green, after they are crushed. This is accomplished by selectively positioning, via rotation by a reversible stepping motor 104 having a pulley 106 on its output shaft which in turn is connected by a belt 108 and pulley 110 to a shaft 112 of a rotatable chute 114 at the end of a glass crushing bin 116, the chute to direct glass cullet smashed by the crushing means to one of a plurality of collection receptacles 118, 120, or 122, depending on the color of the glass cullet. The direction and amount of rotation of stepping motor 104 is responsive directly to a signal received by microprocessor 14.

Figure 7:
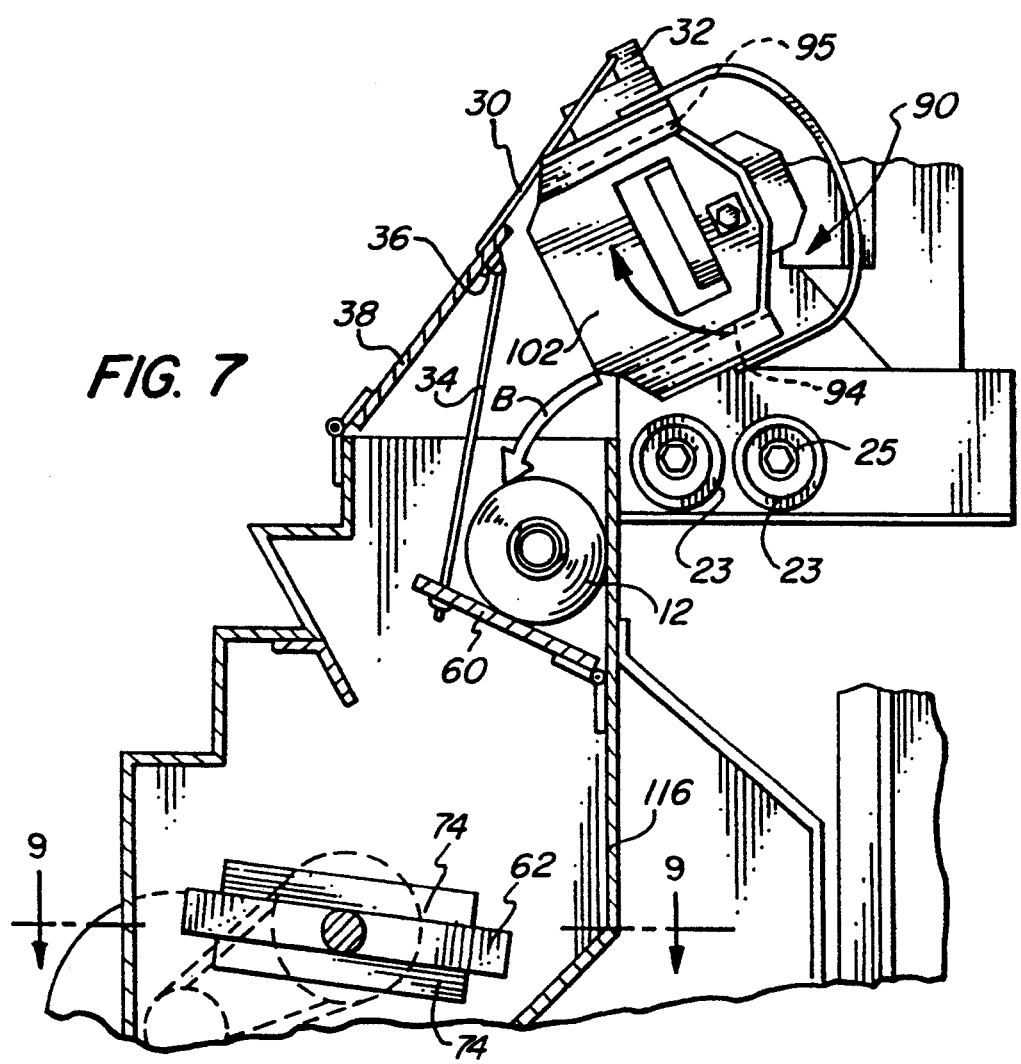
FIG. 7 is a view similar to FIG. 3 with a bottle inserted in the machine being accepted and transported to the crushing means.
Figure 9:
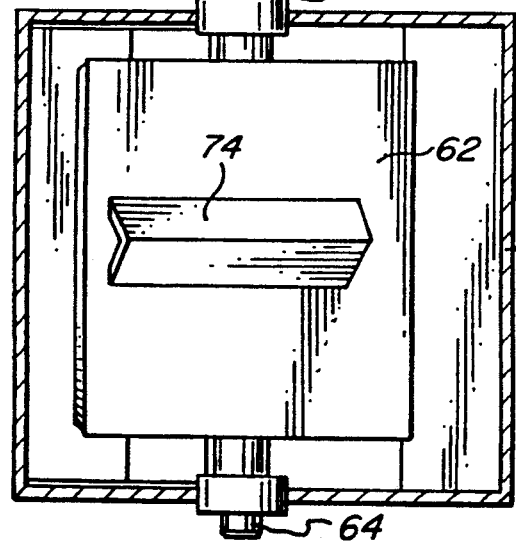
FIG. 9 is a cross-sectional view taken substantially along the plane indicated by line 9—9 of FIG. 7 and illustrates the crushing means of the present invention.
Figure 8:
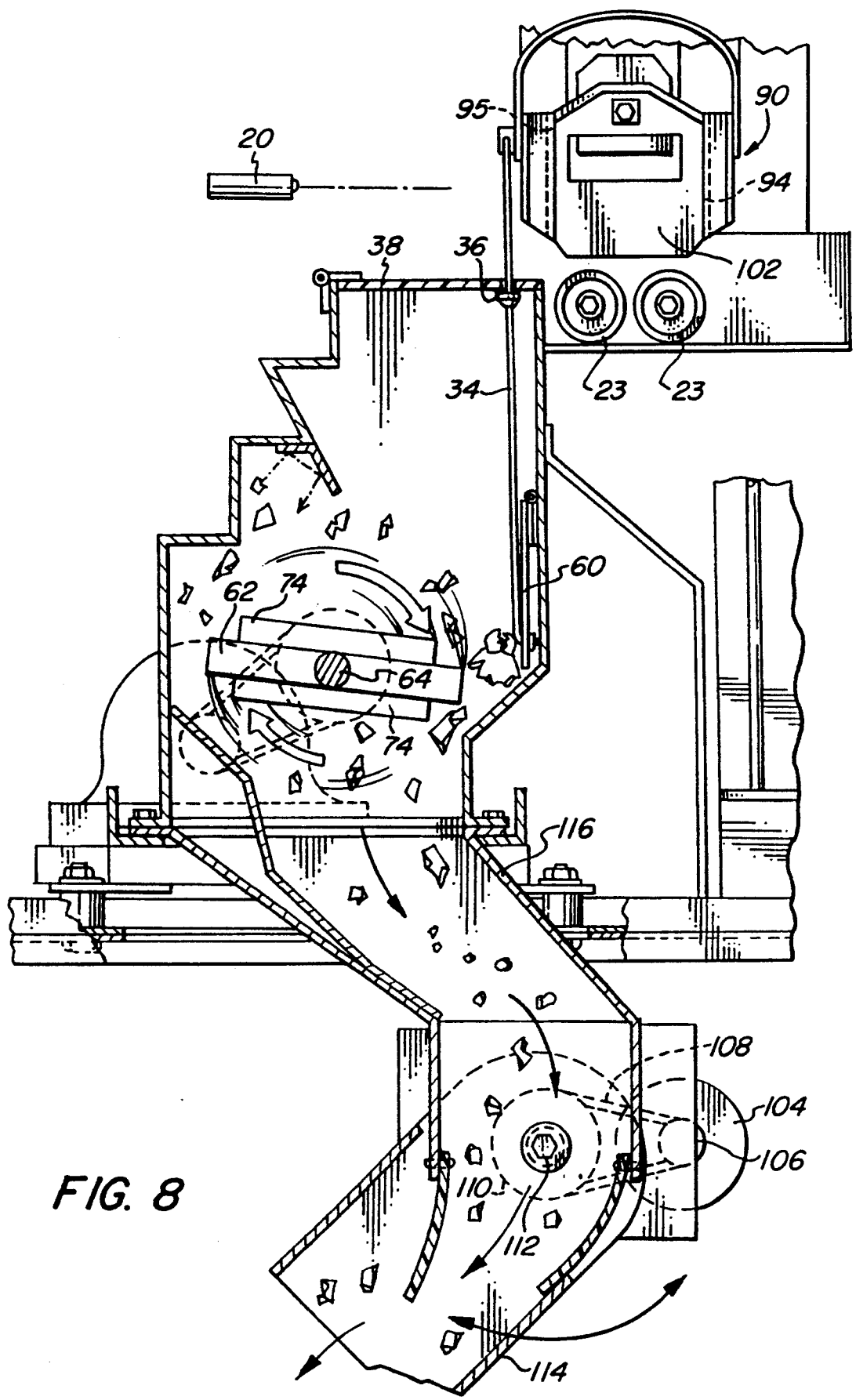
FIG. 8 is a view similar to FIG. 7 further illustrating the crushing means in section and the sorting portion of the machine beneath the crushing means for distributing the crushed glass or glass cullet to an appropriate collection bin containing glass of similar color.
Figure 11:
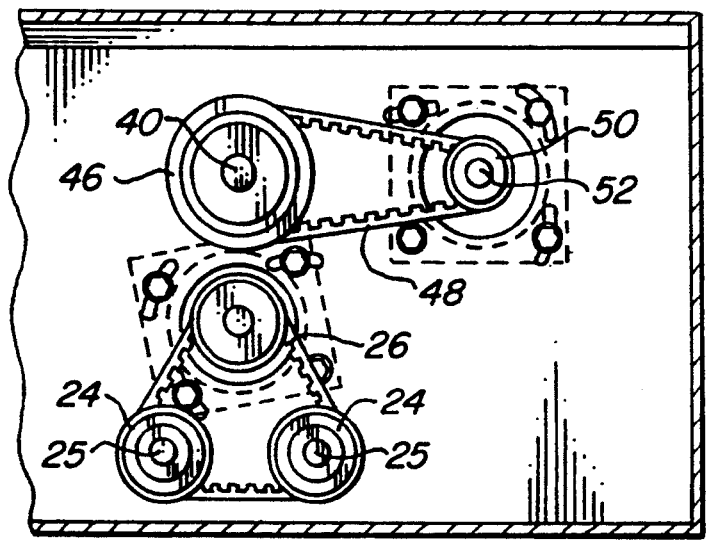
FIG. 11 is a cross-sectional view taken substantially along the plane indicated by line 11—11 of FIG. 5.
Figure 10:
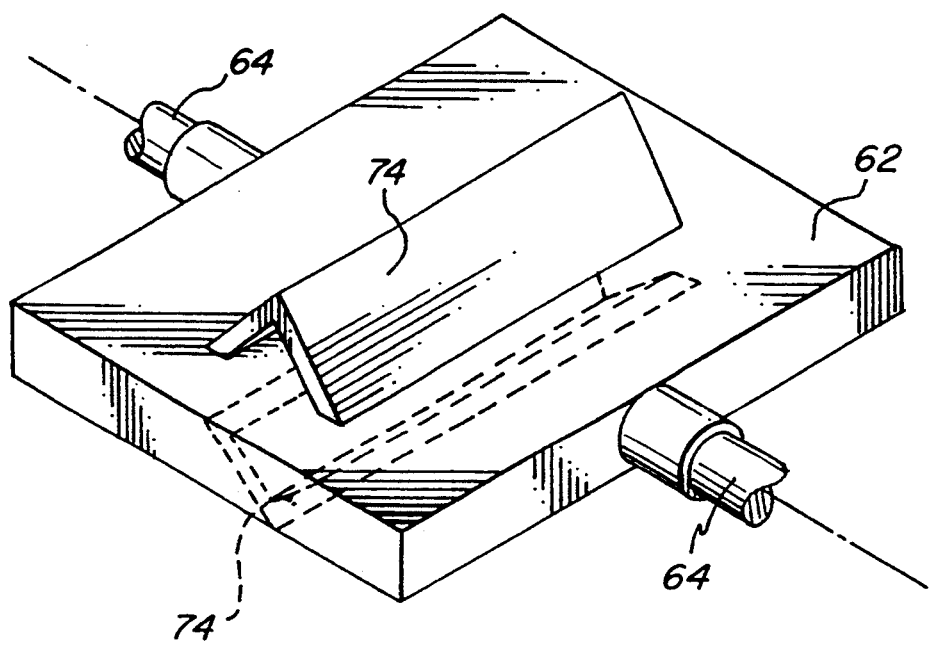
FIG. 10 is a perspective view of the crushing bar of FIG. 9.

Prior to receipt by one of the receptacles 118, 120, 122, the accepted bottle 12 is crushed into glass cullet. With specific reference to FIG. 7, the reversible stepping motor 92 receives a signal from the microprocessor 14 to rotate the harness 90 in a clockwise direction as viewed in FIG. 7, to cause sidewall 95 of harness 90 to contact and move bottle 12 in the direction of arrow B. Simultaneously, a link 30 connected to a laterally extending ear 32 of the harness 90 at one end and a second link 34 at its other end, having a pivotable stop 36 beneath a hinged trap door 38, is pulled upwardly, opening door 38. The opposite end of second link 34 is attached to a pivotable platform 60 housed along the interior sidewall of the crusher bin 116. When trap door 38 is opened, the link 34 also pulls the platform 60 to an angular support position, and bottle 12 falling through the opening left by door 38 is disposed on platform 60. Upon rerotation of harness 90 by reversible motor 92 to close door 38, platform 60 will drop bottle 12 into the crushing bin 116 into contact with a rotatable crushing plate 62 (see FIGS. 8 and 9). The crushing plate is rotatably mounted by shaft 64, to the sidewalls of bin 116. One end of shaft 64 is connected by a clutch 66, pulleys 68, 70 and belt 72 to a motor (not shown), which when activated will rotate shaft 64 and plate 62. Plate 62 has an inverted V-shaped bar 74 on each planar surface of plate 62 for contact with the glass bottle 12 to crush and smash the bottle. After crushing, the glass cullet leaves bin 116 through chute 114 and is deposited in one of the receptacles 118, 120, 122.

The invention may also include dispensing means 76 for issuing coupons 78 at predetermined or random intervals for the collected bottles which can be redeemed for stated refunds. As herein embodied, the token dispensing means includes a dispenser 76 mounted within the housing 10, and electrically connected to the preselection means of the apparatus. Individual coupons 78 are dispensed one at a time through a slot 80 in the door 16 of the housing 10. Preferably, the structure of the dispenser 76 is conventional and accommodates rolls of coupons in the form of tickets. The dispenser may be connected to a counter (not shown) for issuing a coupon only upon acceptance of a predetermined plurality of bottles.

In the illustrated embodiment, the preselection mechanism is actuated by a current from the apparatus power supply, such as an electrical outlet (not shown). When an acceptable refundable bottle is determined to be present with the bottle access area 13, the current through the laser sensor 11 is cut off by the microprocessor 14, and the accepting and crushing means are actuated.

It will be apparent to those skilled in the art that various other modifications and variations could be made in the structure of the invention without parting from the scope and content of the invention.

What is claimed is:

1. Apparatus for collecting and storing refundable empty glass bottles of two or more individual colors and for issuing predetermined return deposits for the bottles collected, each refundable bottle having a code imprinted thereon to identify the brand and color of the bottle, comprising:
   (a) preselection means for determining the brand, color and refundability of a preferred empty glass bottle, the preselection means including a laser scanner for reading the imprinted code on each bottle, a bottle access area configured to accommodate the bottles for exposure to the laser scanner, and a microprocessor capable of receiving and interpreting the read code from the laser scanner;
   (b) means for accepting only a bottle identified by the preselection means as being refundable which need not be returned to the manufacturer in one piece including:
      (1) means for crushing the refundable bottles into glass cullet, and
      (2) means responsive to the code read by said laser scanner for sorting the crushed cullet into two or more colors and depositing the cullet into two or more collection receptacles,
   (c) means for rejecting a bottle identified by said preselection means as being either nonrefundable or to be returned to the manufacturer in one piece, said means including:
      (1) means adjacent said bottle access area for collecting said whole bottle in a separate area contiguous to said accepting means, and
   (d) dispensing means responsive to the preselection means for dispensing at least one redeemable coupon or the like in return for the refundable bottles.

2. The apparatus of claim 1 wherein the collection receptacles are removable and portable.

3. Apparatus for collecting and storing refundable empty glass bottles of two or more individual colors and for issuing predetermined return deposits for the bottles collected, each refundable bottle having a code imprinted thereon to identify the brand and color of the bottle, comprising:
   (a) preselection means for determining the brand, color and refundability of a preferred empty glass bottle, the preselection means including a laser scanner for reading the imprinted code on each bottle, a bottle access area configured to accommodate the bottles for exposure to the laser scanner, and a microprocessor capable of receiving and interpreting the read code from the laser scanner;
   (b) means for accepting only a bottle identified by the preselection means as being refundable which need not be returned to the manufacturer in one piece including:
      (1) means for crushing the refundable bottles into glass cullet, and
      (2) means responsive to the code read by said laser scanner for sorting the crushed cullet into two or more colors and depositing the cullet into two or more collection receptacles,
   (c) means for rejecting a bottle identified by said preselection means as being either nonrefundable or to be returned to the manufacturer in One piece, said means including:
      (1) means adjacent said bottle access area for collecting said whole bottle in a separate area contiguous to said accepting means, and
   (d) dispensing means responsive to the preselection means for dispensing at least one redeemable coupon or the like in return for the refundable bottles, said accepting means further including:
   a rotatable harness having sidewalls and an end wall surrounding said bottle at said bottle access area, and
   reversible drive means responsive to a signal generated by said laser scanner that said bottle is refundable for rotating said harness sidewalls to come into contact with said bottle to push said bottle into said crushing means.

4. The apparatus of claim 3 wherein said rejecting means includes:
   said rotatable harness, and
   said reversible drive means responsive to a signal generated by said laser scanner that said bottle is nonrefundable or is to be returned in one piece for rotating said harness sidewalls in an opposite direction so that the other of said harness sidewalls comes into contact with said bottle to push said bottle towards said separate collection area.

5. The apparatus of claim 3 wherein said accepting means further includes:
   a platform and trapdoor pivotably connected to said harness,
   whereby upon rotation of said harness by said reversible drive means, said trapdoor opens to enable said bottle to be disposed on said platform, and upon reverse rotation of said harness said platform will drop said bottle into said crushing means.

6. Apparatus for collecting and storing refundable empty glass bottles of two or more individual colors and for issuing predetermined return deposits for the bottles collected, each refundable bottle having a code imprinted thereon to identify the brand and color of the bottle, comprising:
   (a) preselection means for determining the brand , color and refundability of a preferred empty glass bottle, the preselection means including a laser scanner for reading the imprinted code on each bottle, a bottle access area configured to accommodate the bottles for exposure to the laser scanner, and a microprocessor capable of receiving and interpreting the read code from the laser scanner;

(b) means for accepting only a bottle identified by the preselection means as being refundable which need not be returned to the manufacturer in one piece including:

(1) means for crushing the refundable bottles into glass cullet, and (2) means responsive to the code read by said laser scanner for sorting the crushed cullet into two or more colors and depositing the cullet into two or more collection receptacles, (c) means for rejecting a bottle identified by said preselection means as being either nonrefundable or to be returned to the manufacturer in one piece, said means including:

(1) means adjacent said bottle access area for collecting said whole bottle in a separate area contiguous to said accepting means, and (d) dispensing means responsive to the preselection means for dispensing at least one redeemable coupon or the like in return for the refundable bottles, said rejecting means including: a rotatable harness having sidewalls and an end wall enclosing said bottle at said bottle access area, and reversible drive means responsive to a signal generated by said laser scanner that said bottle is nonrefundable or is to be returned in one piece for rotating said harness sidewalls to come into contact with said bottle to push said bottle towards said separate collection area.

7. The apparatus of claim 4 wherein said rejecting means further includes:

a ramp and trapdoor closing an opening into said separate collection area adapted to be opened and lowered into the path of movement of said rejected bottle pushed by said harness sidewall in response to the preselection means identifying a refundable bottle which must be returned to the manufacturer in one piece to guide said bottle into said separate collection area.

8. Apparatus for collecting and storing refundable empty glass bottles of two or more individual colors and for issuing predetermined return deposits for the. bottles collected, each refundable bottle having a code imprinted thereon to identify the brand and color of the bottle, comprising:

(a) preselection means for determining the brand, color and refundability of a preferred empty glass bottle, the preselection means including a laser scanner for reading the imprinted code on each bottle, a bottle access area configured to accommodate the bottles for exposure to the laser scanner, and a microprocessor capable of receiving and interpreting the read code from the laser scanner;

(b) means for accepting only a bottle identified by the preselection means as being refundable which need not be returned to the manufacturer in one piece including:

(1) means for crushing the refundable bottles into glass cullet, and (2) means responsive to the code read by said laser scanner for sorting the crushed cullet into two or more colors and depositing the cullet into two or more collection receptacles, (c) means for rejecting a bottle identified by said preselection means as being either nonrefundable or to be returned to the manufacturer in one piece, said means including:

(1) means adjacent said bottle access area for collecting said whole bottle in a separate area contiguous to said accepting means, and (d) dispensing means responsive to the preselection means for dispensing at least one redeemable coupon or the like in return for the refundable bottles, said sorting means including:

rotatable chute means contiguous to the lower end of said crushing means, and reversible drive means for rotating said chute means in response to the code read by said laser scanner to position said chute means over one of said collection receptacles.

9. Apparatus for collecting and storing refundable empty glass bottles of two or more individual colors and for issuing predetermined return deposits for the bottles collected, each refundable bottle having a code imprinted thereon to identify the brand and color of the bottle, comprising:

(a) preselection means for determining the brand, color and refundability of a preferred empty glass bottle, the preselection means including a laser scanner for reading the imprinted code on each bottle, a bottle access area configured to accommodate the bottle for exposure to the laser scanner, and a microprocessor capable of receiving and interpreting the read code from the laser scanner;

(b) means for accepting only a bottle identified by the preselection means as being refundable which need not be returned to the manufacturer in one piece including:

(1) means for crushing the refundable bottles into glass cullet, and (2) means responsive to the code read by said laser scanner for sorting the crushed cullet into two or more Colors and depositing the cullet into two or more collection receptacles, (c) means for rejecting a bottle identified by said preselection means as being either nonrefundable or to be returned to the manufacturer in one piece, said means including:

(1) means adjacent said bottle access area for collecting said whole bottle in a separate area contiguous to said accepting means, and (d) dispensing means responsive to the preselection means for dispensing at least one redeemable coupon or the like in return for the refundable bottles, said crushing means including:

a plate rotatably mounted in a confined space below said bottle access area, drive means for rotating said plate, and an inverted V-shaped bar on opposed surfaces of said plate.

10. Apparatus for collecting and storing refundable empty glass bottles of two or more individual colors and for issuing predetermined return deposits for the bottles collected, each refundable bottle having a code imprinted thereon to identify the brand and color of the bottle, comprising:

(a) preselection means for determining the brand, color and refundability of a preferred empty glass bottle, the preselection means including a laser scanner for reading the imprinted code on each bottle, a bottle access area configured to accommodate the bottles for exposure to the laser scanner, and a microprocessor capable of receiving and interpreting the read code from the laser scanner; and (b) means for accepting only a bottle identified by the preselection means as being refundable which need not be returned to the manufacturer in one piece including:

(1) means for crushing the refundable bottles into glass cullet regardless of color, and
(2) means responsive to the code read by said laser scanner for sorting the crushed cullet into two or more colors and depositing the cullet into two or more collection receptacles.

* * * * *